Feb. 7, 1967 F. J. PRINES 3,303,408

RISE TIME CIRCUIT FOR SILICON CONTROLLED RECTIFIER

Filed Jan. 25, 1963

3 Sheets-Sheet 1

WITNESSES

John G. Chopp

James F. Young

INVENTOR

Frank J. Prines

BY John L. Stoughton

ATTORNEY

United States Patent Office 3,303,408
Patented Feb. 7, 1967

3,303,408
RISE TIME CIRCUIT FOR SILICON CONTROLLED RECTIFIER

Frank J. Prines, Penn Hills, Pa., assignor to Westinghouse Electric Corporation, Pittsburgh, Pa., a corporation of Pennsylvania Filed Jan. 25, 1963, Ser. No. 253,815
14 Claims. (Cl. 321—45)

This invention relates generally to apparatus for inverting unidirectional electrical potential into alternating potential and more particularly to those devices in which the simultaneous conduction of two valves must be prevented. It also relates to those devices in which the valves are of the type in which the initiation of conduction is controlled but subsequent conduction is terminated by external circuit means.

It is a prime object of this invention to provide an improved inverting network.

Another object of this invention is to provide, in such an inverting network, means to prevent the initiation of conduction of a subsequent to become conductive valve while a previous valve is still conducting.

Another object of this invention is to provide means for rendering the control valves conducting and to thereafter interrupt this initiating means to reduce the power required to control the inverter valves.

Other objects will be apparent from the specification, the hereinafter appended claims and the drawings, in which:

Figure 5:
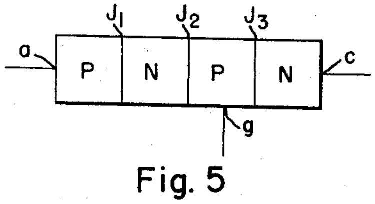
Figure 4:
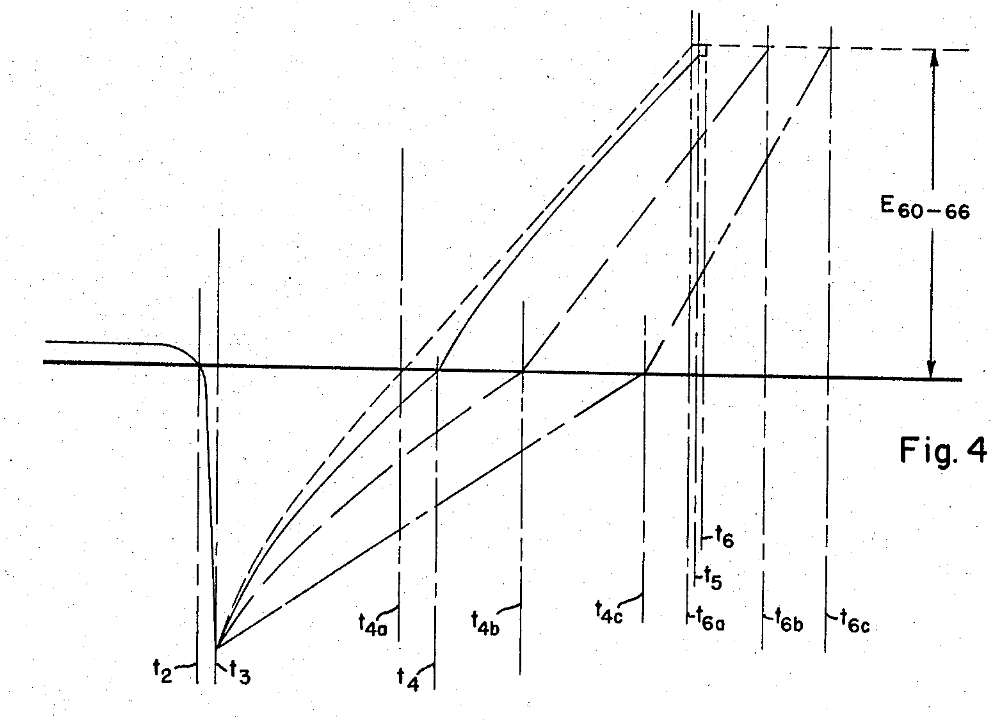

FIG. 4 graphically shows certain operating characteristics of the main valve devices; and, FIG. 5 diagrammatically illustrates the semiconductor arrangement of the main valve devices.

Referring to the drawings by characters of reference the numeral 1 indicates generally an inverter having a power switching section 2 with output terminals 4 and 6 connected through a filter 8 to a load 10 and input terminals 12 and 14 energized with unidirectional potential from a suitable direct current power voltage supply 16.

The switching section 2 comprises a pair of power conducting paths interconnecting the input terminals 14 and 12 with the output terminals 4 and 6. The first of these paths includes a first semiconductor switching device 18, the filter 8, load 10, and switching device 20. The second of these paths includes the switching devices 22 and 24. As illustrated, the devices 18, 20, 22 and 24 are of the intermittent control type in which initiation of current flow through its power circuit (anode *a* to cathode *c*) is controlled by means of a signal provided between its gate *g* and its cathode *c*. When the devices 18 and 20 are conducting, the output terminal 4 will be maintained at a positive potential with respect to the output terminal 6. This relationship will be arbitrarily taken as the positive half cycle. Similarly, when the devices 22 and 24 conduct, the output terminal 4 will be maintained negative with respect to the output terminal 6 and will be considered as the negative half cycle.

The pairs of devices 18–20 and 22–24 are sequentially rendered conductive by means of signals derived from a pulse generator 26. This pulse generator comprises an output transformer 28 having a plurality of secondary windings 29, 31 and windings 30, 32, 34 and 36 which are respectively connected between the gates *g* and cathodes *c* of the devices 18, 20, 22 and 24. The transformer 28 is energized through first and second power paths 35 and 37 from a suitable source of unidirectional potential (not shown) connected to its input terminals 38 and 40 under control of a pair of switching devices 42 and 44 illustrated as being transistors.

The first path 35 extends from the terminal 38 through a diode 33, a common emitter bus 41, emitter *e* to collector *c* of the transistor 42, the upper half of the center tapped primary winding 43, and resistor 45 to the other input terminal 40. The second path 37 extends from the terminal 38 through diode 33, bus 41, emitter *e* to the cathode *c* of transistor 44, the lower half of the winding 43 and resistor 45 to terminal 40.

Conduction of the transistors 42 and 44 is initiated in response to a signal derived from a square wave oscillator 46 and applied across the primary winding 47 of a control transformer 48. The transformer 48 is provided with a center tapped secondary winding 49. The end terminals of the winding 49 are individually connected to the bases *b* of the transistors 42 and 44 through diodes 51 and 53. The center tap of winding 49 is connected to the common emitter bus 41 through the diode 33 and a switching device 50, illustrated as being a transistor, which controls the time periods during which the transformer 48 is effective to initiate conduction of the devices 42 and 44.

Conduction of the device 50 is controlled by means of a pluse drive circuit 52 under control of the switching section 2, in a manner to be more fully described below, to prevent the pulse generator 26 from rendering the pairs of devices 22–24 or 18–20 conductive if any of the devices 18, 20, 22 and 24 are conductive. This prevents the establishment of a low impedance path or short-circuiting path between the input terminals 12 and 14 through the devices 18–24 or 22–20. Power for driving the square wave oscillator 46 is derived from the lower voltage supply source 54.

Normally, the combined electrical characteristics of the filter 8 and load 10 is such as to provide a leading current between the output terminals 4 and 6 of the power switching section 2 whereby the reactive current supplied by this filter load combination 8–10 will extinguish current conduction through the devices 18–20 or 22–24, as the case may be, prior to the time that the pulse generator 26 renders the other of the devices 22–24 or 18–20, as the case may be, conductive. If, due to transient load condition or any other cause, conduction through one or both of the devices of the pairs of devices 18–20 or 22–24 has not extinguished, at the time that the pulse generator 26 would normally render conductive the next set of devices 22–24 or 18–20, as the case may be, a signal will be applied to the pulse drive control circuit 52 from the inverter 2 whereby this circuit 52 will render the switching device 50 non-conductive and prevent the pulse generator 26 from supplying a conducting pulse until such time as the current through both of the devices which were last rendered conducting, terminates.

Feedback current for the transistors 42 and 44 is derived from the secondary windings 29 and 31 which are respectively connected across resistors 55 and 56 individually in series with resistor-capacitor networks 57 and 58, respectively. The resistors 55 and 56 are individually connected in shunt across the emitter $e$ and base $b$ of the transistors 42 and 44. The polarity of the windings 29 and 31 are such that they tend to bias the conducting one of the transistors 42 and 44 into full conduction and the blocked one thereof into fully blocked condition.

The core of the transformer 28 is preferably of a material exhibiting a hysteresis loop of substantially rectangular shape and is saturable in a time period which, within the limits of safety, is just long enough to insure conduction of the pairs of devices 18–20 or 22–24 as the case may be. Normally, the device 50 will be conductive at or about the beginning of the time that the square wave oscillator 46 reverses and the devices 18–20 or 22–24 will be rendered conducting substantially in phase with the output voltage of the oscillator 46. If, however, the pulse drive circuit 52 maintains the device 50 nonconductive, the transistors 42 and 44 cannot be rendered conductive and the energization of the transformer 28 is delayed. The transformer 48 will not saturate so that the control voltage therefrom will be applied to turn on one of the transistors 42 and 44 and thereby supply a pulse to the pairs of devices 18–20 or 22–24 as soon as the pulse drive circuit 52 renders the device 50 conductive irrespective of the delay interval. As indicated, the switching section 2 is normally in phase with the oscillations of the square wave oscillator 46 except when the initiation of the conduction of the pairs of devices 18–20 or 22–24 must be delayed for the reasons recited above.

The power switching section 2 comprises a positive potential bus 60 connected to the positive potential input terminal 12. Anodes $a$ of the devices 18 and 22 are directly connected to this bus. The cathode $c$ of the device 18 is connected through an asymmetric current conducting device 62, which may take the form of a semiconductor diode, to the output terminal 4. The polarity of the device 62 is such that it presents its minimum impedance to current flow in a direction of current flow from the positive bus 60 to the output terminal 4. The output terminal 6 is connected through a similar asymmetric current conducting device 64 to the anode $a$ of the switching device 20, the cathode $c$ of which is connected to the negative bus 66 which connects to the negative input terminal 14. The circuits from bus 60 through devices 18 and 62 to terminal 4 and from terminal 6 through devices 64 and 20 to bus 66 provide the first or positive potential power conducting network interconnecting the input terminals 12 and 14 to the output terminals 4 and 6.

The second or negative potential power conducting network connecting the sets of terminals 4–6 and 12–14 comprises a circuit which extends from the positive bus 60 through the switching device 22 and an asymmetric current conducting device 68, which is preferably similar to the device 62, to the output terminal 6 and a circuit which extends from the output terminal 4 through an asymmetric current conducting device 70, again similar to the device 62, the switching device 24 to the negative bus 66.

The combined electrical characteristics of the filter 8 and load 10 provides a leading current at the output terminals 4 and 6. If, as is usually the case, the electrical characteristic of the load 10 is a lagging power factor or at best a unity power factor, leading current must be supplied by means of the electrical characteristics of the filter 8. The filter 8 may take any of numerous forms as for example the form shown in which the load 10 is connected in series with a capacitor 72 and inductance 74 and a capacitor 76 is connected in shunt with the load 10.

Diodes 78, 80, 82 and 84 are connected in anti-parallel with the devices 18–62, 20–64, 22–68 and 24–70 to pass reactive current and limit the inverse voltage across the devices 18, 20, 22 and 24. As will be brought out more fully below, these diodes also serve to connect the cathodes of the devices 62 and 68 to the bus 60 and the devices 64 and 70 to the bus 66 to limit the rate at which voltage may be established across the devices 18, 20, 22 and 24.

The switching section 2 also includes control circuitry which supplies signals to the pulse drive circuit 52 as a function of the conductive condition of the devices 18, 20, 22 and 24. In order to provide a signal responsive to the conductive condition of the path through the switching device 18, a pair of resistors 86 and 88 are series connected together and then connected between the cathode $c$ of the switching device 18 and the bus 66. The output signal is conducted to the circuit 52 by a conductor 90 connected to the common connection 92 between the resistors 86 and 88. When the device 18 is conducting, the terminal 89 of the resistor 86 is effectively directly connected to the positive bus 60 through the device 18, and the potential of the common connection 92 will be at a potential between that of the conductors 60 and 66 as determined by the relative magnitudes of the resistances of the resistors 86 and 88 since the drop through the device 18 is negligible as compared with the drops across the resistors. A diode 94 may be connected between terminal 89 and bus 60 if desired for a purpose which will be described below.

Similarly, resistors 96 and 98 are series connected between the cathode of the device 22 and the negative bus 66. The output signal is conducted to the circuit 52 by a conductor 100 connected to the common connection 102 between the resistors 96 and 98. If desired, a diode 104 may be connected between terminal 105 of resistor 96 and the bus 60. To sense the conductive condition of the devices 24 and 20, resistors 106 and 108 are individually connected respectively between the anodes $a$ of the devices 24 and 20 and the positive bus 60. Conductors 114 and 116 are connected to the end terminals 107 and 109 of the resistors 106 and 108 which connect to the devices 24 and 20. The potentials of these conductors 114 and 116 will vary depending upon the conductive condition of the devices 24 and 20. If desired, diodes 118 and 120 may be individually connected respectively between the terminals 107 and 109 of the resistors 106 and 108 and the bus 66.

The potentials applied by the conductors 90, 100, 114 and 116 to the pulse drive circuit control the drive current applied to the transistor 50 and permit conduction of this transistor 50 solely during intervals in which none of the switching devices 18, 20, 22 and 24 are conducting. The conductors 90 and 100 are connected through blocking diodes 122 and 124 respectively to a conductor 126 which is connected to one end of a resistor 132. The other terminal of the resistor 132 is connected by a conductor 128 to the negative bus 66 of the power switch section 2. The resistor 132 is shunt connected between the base $b$ and emitter $e$ of the transistor 50. It will be apparent that whenever one of the switching devices 18 and 22 conducts the potential of one of the conductors 90 and 100 will be raised whereby current will flow through the resistor 132 to bias the base $b$ positively with respect to the emitter $e$ of the transistor 50 interrupting the circuit between the center tap of winding 49 and the bus 41 to prevent operation of the pulse generator 26 and the initiation of conduction of any of the switching devices 18, 20, 22 and 24.

The conductors 114 and 116 are connected respectively through resistors 134 and 136, a conductor 138 and a resistor 140 to the conductor 128 which is connected to the negative bus 66. The potential appearing across the resistor 140 controls the conductive condition of a transistor 142 which has its emitter-collector circuit shunt connected with a resistor 144. For this purpose the one terminal of the resistor 140 is connected to the base $b$ of the control transistor 142 and the other terminal of the resistor 140 to the emitter $e$ of the transistor 142. The resistor 144 is connected in series with a second resistor 146 between the positive terminal of the power voltage supply 16 and negative terminal of the supply 16 through the conductor 128. The common connection 148 of the resistors 144 and 146 is connected through a diode 150 to the conductor 126. With this arrangement, any positive potential at connection 148 with respect to the conductor 128 will energize the bias resistor 132 in a direction to block the device 50.

During the intervals in which both of the devices 20 and 24 are not conducting the transistor 142 should be maintained conductive to short circuit the resistor 144 and thereby remove the blocking potential produced thereby at the resistor 132. For this purpose, the magnitudes of the resistances of the resistors 106, 108, 134, 136 and 140 are such that the resistor will be energized sufficiently to maintain the base $b$ of the transistor 142 at a potential sufficiently elevated with respect to its emitter $e$ whereby he transistor 142 will be in a conductive condition. When one of the devices 20 and 24 conduct, the potential of the corresponding terminal 107 or 109 will be reduced to substantially that of the negative bus 66. To insure that transistor 142 blocks under these conditions, a blocking bias voltage is produced across the resistor 140 by the low voltage supply 54. The positive terminal 156 of the supply 54 is directly connected to conductor 128 while its negative terminal 154 is connected to conductor 138 by a resistor 152.

It will be appreciated that the positive terminal 156 of the low voltage supply is effectively connected to the end of the resistor 132 connected to the emitter $e$ of the transistor 50, and the negative terminal 154 of the low voltage supply 54 is connected through a resistor 158 to the conductor 126 which is connected to the end of the resistor 132 connected to the base $b$ of the transistor 50. The low voltage supply 54 thereby provides a slight bias across the resistor 132 in a polarity tending to maintain the emitter $e$ positive with respect to the base $b$ of the transistor 50 and the circuit between its collector $c$ and emitter $e$ in a conductive condition.

Figure 1:
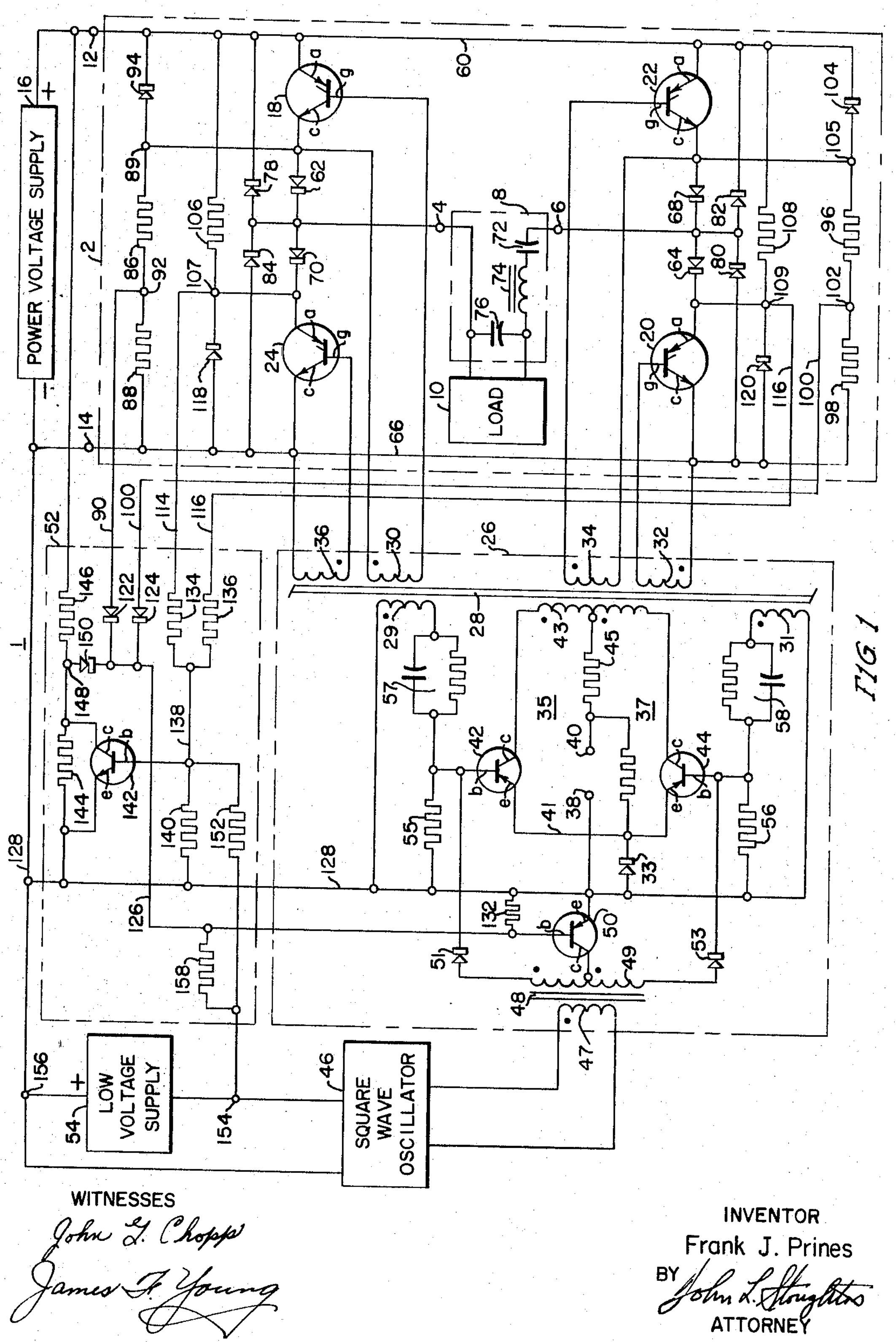
FIG. 1 is a schematic diagram illustrating an inverter embodying the invention.
Figure 2A:
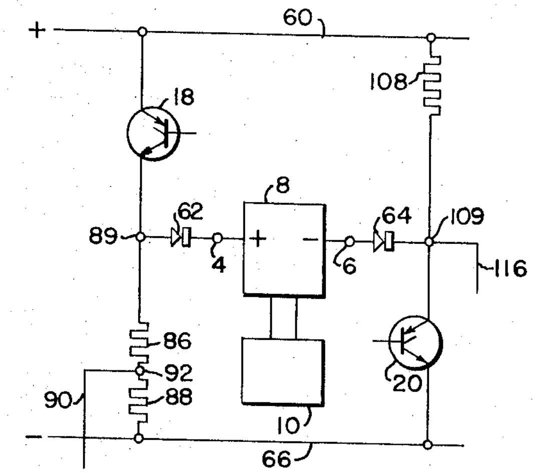
FIG. 2A shows the conducting paths during the positive half cycle in which the output terminals are energized by direct conduction from the source when current is flowing from the source to the load.

It is believed that the remainder of the construction may best be understood by a description of operation of the inverter network 1. The power voltage supply 16, during operation, maintains the positive bus 60 positive with respect to the negative bus 66 in the power switching network 2 and a potential across the resistor network 144–146. Also, the low voltage supply 54 maintains a potential difference between its output conductors 156 and 154 for purposes of energizing the square wave oscillator 46 and of providing bias voltages to the transistors 142 and 50 in conjunction with bias voltages applied thereto through the conductors 90, 100, 114 and 116. Assume that the network 1 is operating to provide a square wave of voltage E (FIG. 3A) and a generally sinusoidal wave of current I at the output terminals 4 and 6. Further, assume a time $t_1$ which is any time between a time $t_0$ (the time at which the pulse generator 26 fired or rendered the switching devices 18 and 20 conductive to start a positive half cycle of voltage E) and a time $t_2$ (which is the time that the current I between the terminals 4 and 6 goes to zero). During this time interval $t_0$–$t_2$, the switching devices 18 and 20 will be conducting and current $i_1$ will be flowing between the positive bus 60 and negative bus 66 through the switching device 18, the asymmetric current conducting device 62, the network 8, the load 10, the asymmetric device 64, and conducting switching device 20 as schematically shown in FIG. 2A.

Conduction of the device 18 effectively connects terminal 89 to the positive bus 60 thereby raising the potential of the common connection 92 and of the conductor 90 to provide a control signal to the pulse driving circuit 52. As a result of this change in potential of connection 92, current flows therefrom through conductor 90, diode 122, conductor 126, resistor 132, and conductor 128 back to the negative bus 66 and establishes a potential across the resistor 132 which keeps the transistor 50 blocked and the secondary circuit of the transformer 48 open. Similarly, conduction of the switching device 20 maintains the potential of the terminal 109 and conductor 116 substantially at the potential of the negative bus 66 whereby the potential of the base $b$ of the transistor 142 is maintained negative with respect to the emitter $e$ thereof to effectively insert the resistor 144 in series with the resistor 146 between the positive and negative buses 60 and 66. This causes the potential of the common connection 148 to be raised and current to flow therefrom through the diode 150, conductor 126, resistor 132, and conductor 128, to energize the resistor 132 in the same polarity as above described to insure that the transistor 50 will remain blocked as long as either of the switching devices 18 or 20 remains conducting.

Figure 2B:
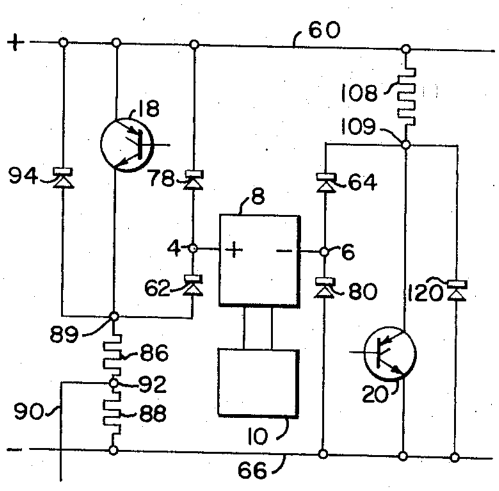
FIG. 2B shows the conducting paths during the following time interval in which reactive current is being supplied from the load and prior to initiation of conduction of the negative half cycle.

At the time $t_2$ the current flow I (FIG. 3A) between the terminals 4 and 6 will terminate due to the electrical characteristics of the load 10 and filter 8 causing current ($i$) through the switching devices 18 and 20 to terminate. The current I between the terminals 4 and 6 will not remain zero but will reverse whereby current will flow outwardly from the terminal 4 through the diode 78, the bus 60, the power voltage supply 16, the bus 66 and the diode 80 back to the output terminal 6. This will continue for the period $t_2$–$t_6$. The conductive elements during this period are shown in FIG. 2B.

At this time $t_6$, the square wave oscillator 42 will reverse the output polarity of its voltage to reverse the energization of the input transformer 48 of the pulse generator 26. When this occurs the terminals of the transformer 48 having the dots will become negative with respect to the terminals having no dots whereby current will flow from the lower terminal of the secondary winding 49 through the diode 53, the network 58, the winding 31 and the emitter collector of the transistor 50 back to the center tap connection of the winding 49. Current will also flow from the lower end of the winding 49, the diode 53, a resistor 56 and the device 50 to the center tap connections thereby energizing the resistor in a polarity to insure continued blocking of the transistor 44.

Figure 2C:
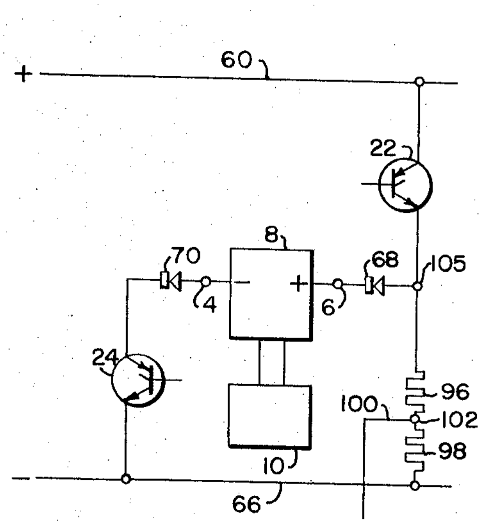
FIG. 2C illustrates the conducting paths during the negative half cycle when current is being supplied from the source to the output terminals.

Current flowing through the winding 31 induces flux in the core of the transformer 28 which tends to make the dot terminal of the winding 29 positive with respect to the other terminal of this winding 29. This causes current to flow from the dot terminal through the resistor 55 and network 57. The potential established across the resistor raises the potential of the emitter $e$ of the transistor 42 relative to its base $b$ rendering the transistor 42 conducting. This completes the circuit through the path 35 and causes a reversal of flux in the core of the transformer 28 to render the dot terminals of the windings of the transformer still more positive with respect to the non-dot terminals. This polarity is incorrect to render the devices 18 and 20 conductive and they remain blocked. The polarity is correct to render the switching devices 22 and 24 conducting. These devices 22 and 24 conduct to supply current from the positive bus 66 through the switching device 22, the asymmetric device 68, the filter 8, load 10, the asymmetric device 70 and the switching device 24 to the negative bus 66 as illustrated in FIG. 2C. A short time interval after the devices 22 and 24 are rendered conducting, the core of the transformer 28 will saturate whereby the drive signal will be removed from transistor 42 and it will block. The devices 22 and 24 will continue to conduct and current continues ($i_2$) to flow through the devices 22 and 24 and the load 10 and filter 8 in the above-mentioned direction until the time $t_7$ when the current I between the terminals 4 and 6 reverses to extinguish the conduction through the switching devices 22 and 24 in substantially the manner described above in connection with the devices 18 and 20 at time $t_2$.

Figure 2D:
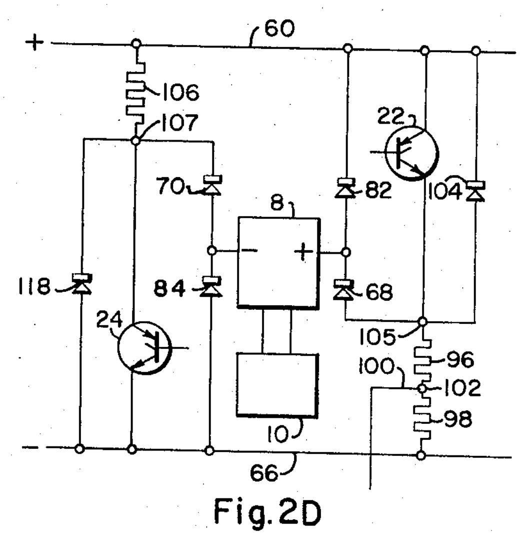
FIG. 2D shows the conducting paths during the time intervals in which reactive power is being supplied from the load at the end of the negative half cycle.

Upon reversal of the current flow between the terminals 4 and 6, current will flow outwardly from the terminal 6 through the diode 82, positive bus 60, power voltage supply 16, negative bus 66, and diode 84 back to the terminal 4 as illustrated in FIG. 2D. This current flow through the diodes 82 and 84 and power voltage supply 6 will continue until the time $t_{11}$ at which time the output voltage of the square wave oscillator reverses thereby rendering the dot terminals of the windings of the transformer 48 positive with respect to the undotted terminals causing current to flow outwardly from the dotted end terminal of the winding 49 through the diode 51, network 57, winding 29, transistor 50 back to the center tap of the winding 49. Current flow through the winding 29 causes the undotted terminal of the winding 31 to become positive with respect to its dot terminal. When so energized, winding 31 energizes the resistor 56 in a polarity to cause turn-on base current to flow in the transistor 44 which thereupon conducts to energize the lower half of the winding 43. This causes the flux in the core of the transformer to continue to change in a direction tending to make the undotted terminals of its windings positive with respect to the dot terminals until the core saturates. Prior to saturation of the winding 31 and after the device 50 opens the circuit therethrough, the winding 31 maintains the transistor 44 fully conductive and the winding 29 maintains the transistor 42 blocked. The windings 30, 32, 34 and 36 also will be held energized.

Energization of the windings 34 and 36 is ineffective since their output is not such as to turn the devices 22 and 24 on. However, the polarity of the potential supplied by the windings 30 and 32 is effective to render the devices 18 and 20 conducting whereby current flows from the positive bus 60 through the device 18, the asymmetric device 62, the filter 8, the load 10, the asymmetric device 64 and switching device 20 to the negative bus 66 thereby supplying energy from the power voltage supply 16 to the load 10. As will be apparent from an examination of FIG. 3, the time $t_{11}$ is equal to the time $t_0$ except that it is 360 electrical degrees later. Shortly after time $t_{11}$ the core of the transformer 28 saturates, the transistor 44 blocks and the apparatus will continue to operate, as above described, to alternate conduction of the pairs of devices 18–20 and 22–24.

The forward drop of the diode 33 is equal to or greater than the voltage induced by the collapsing flux in the core of the transformer 28 from its saturated value to its residual value thereby rendering this collapse ineffective to render the blocked one of the transistors conducting. Both transistors 42 and 44 therefore will be in their nonconducting condition subsequent to saturation of the core of the transformer 28 and during the major portion of the conducting period of the devices 18–20 and 22–24. As above described, conduction of any one of the control devices 18, 20, 22 and 24 causes the resistor 132 to become energized at a polarity to maintain the transistor 50 nonconducting so that no power will flow from the transformer 48 into the pulse generator 26 during the major portion of the time the pairs of devices 18–20 or 22–24 conduct.

Figures 3A, 3B, 3C:
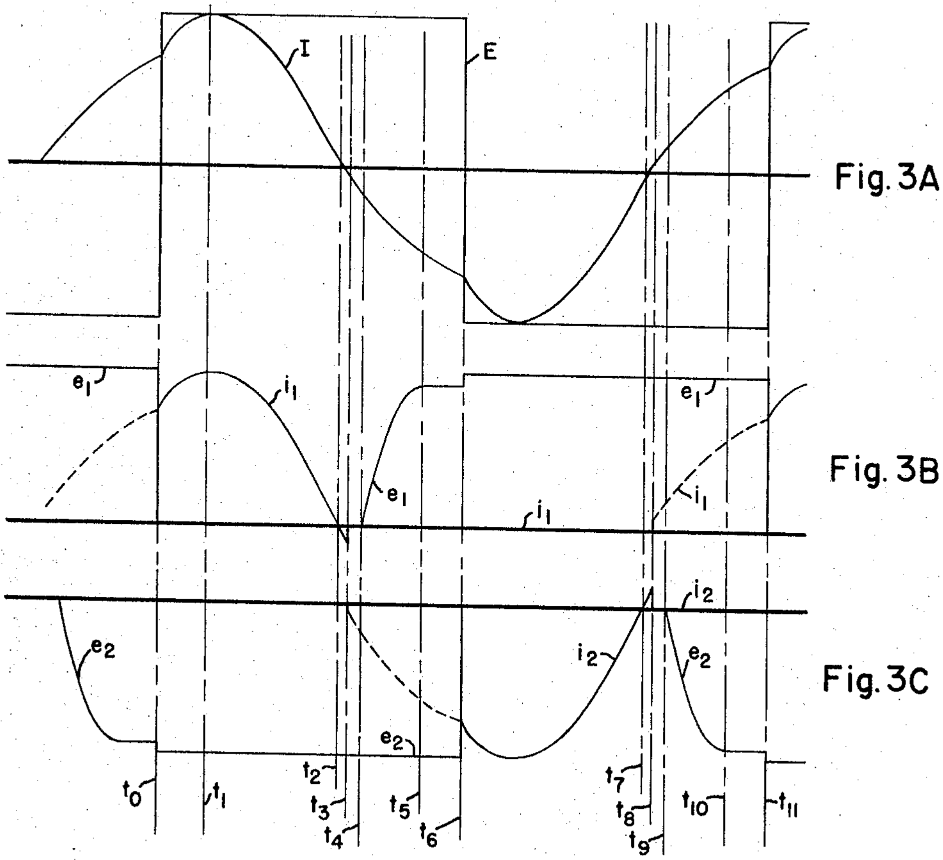
FIGS. 3A, 3B and 3C are graphic representations of certain of the operating characteristics of the inverter.

In semiconductor devices of the controlled rectifier type, as for example a silicon controlled rectifier, a predetermined time interval must elapse between the time that the current therethrough reaches zero and the time that voltage is re-established across its anode and cathode. This time interval is somewhat longer if the rate at which the voltage is re-estabilshed is increased and vice versa. The time vs. rate of application of this voltage is an inherent characteristic of the valve device and cannot be exceeded without the valve device again becoming conductive. By the use of my circuitry which includes the devices 62, 64, 68 and 70 and the resistors 86, 88, 96, 98, 106 and 108, the abruptness of the re-application of full line potential across the devices 18, 20, 22 and 24 may be reduced so as to minimize the time interval necessary to prevent reconduction of the blocked device. This circuitry functions during the time interval represented by the times $t_3$–$t_6$ and $t_8$–$t_{11}$ depending upon which set of devices 18–20 or 22–24 are being considered. The curve $e_1$ ($t_3$–$t_6$) and curve $e_2$ ($t_8$–$t_{11}$) illustrate the re-application of voltage to the devices 18–20 and 22–24 respectively. At the times $t_6$ and $t_{11}$ because of the rendering of the pairs of devices 22–24 and 18–20 respectively conducting, the full potential will be reapplied across the pairs of devices 18–20 and 22–24 respectively. As illustrated in FIG. 3B, a substantial time interval exists between times $t_3$ and $t_6$. If this interval is greater than the time interval required by the switching device to withstand the sudden imposition of full voltage thereacross, the apparatus would operate as above described without the necessity of the addition of the rise time diodes 62, 64, 68 and 70 and their associated resistor networks 86–88, 108, 96–98, and 106. Since, however, the time interval between the time $t_2$ and $t_6$ is dependent upon the power factor of the network connected to the output terminals 4 and 6 and such power factor may vary considerably, it becomes highly desirable to provide apparatus which will operate with as short time intervals $t_3$–$t_6$ and $t_8$–$t_{11}$ as possible. It will be readily apparent that an inverter network which will operate satisfactorily with a variety of loads of differing power factor is highly desirable. It is furthermore desirable to use inverters with loads which have widely varying power factors during operation such as an electric motor.

The asymmetric device 62 may, as suggested above, take the form of a semiconductor diode which requires an appreciable time interval to reform and prevent reverse current from flowing therethrough subsequent to conduction in its forward direction. This time interval should be greater than the time interval $t_2$–$t_3$ which is required for reforming the $J_1$ and $J_3$ junctions in the switching device 18 (FIG. 5) to permit reverse current to flow through the device 20. This application of reverse voltage and consequent flow of reverse current considerably reduces the time required to reform the junctions $J_1$ and $J_3$ of the device 20 (FIG. 5) but has no substantial effect on the junction $J_2$. As indicated in FIG. 4, semiconductor devices of the controlled rectifier type have a fixed minimum time ($t_2$–$t_4$) below which the device will not remain blocked upon the reapplication of forward voltage. Even after this time interval has elapsed the rate at which forward voltage may be reapplied must be maintained below the dotted line extending between the time lines $t_{4a}$ and $t_{6a}$. Therefore, even with a low rate of increase of forward voltage, the device 20 will not support full forward voltage until a lapse of time $t_2$–$t_{6a}$. As further indicated by the dash lines and dash-dot lines (FIG. 4), an increase in the interval between the time forward voltage ($t_2$) ceases and any forward voltage ($t_{4b}$ or $t_{4c}$) reapplied results in an increased time period before full forward voltage ($t_{6b}$–$t_{6c}$) may be reapplied. With my circuitry the time $t_4$ may be substantially the time $t_{4a}$ and the time $t_6$ may be made substantially the time $t_{6a}$ whereby the minimum interval $t_2$–$t_6$ is limited only by the inherent characteristics of the device itself.

The devices 62, 64, 68 and 70 permit the required reverse current flow through the respective devices 18, 20, 22 and 24 with which they are associated and cooperate with their respective resistors 86–88, 108, 96–98 and 106 to provide voltage dividers in which the devices 62, 64, 68 and 70 act as variable impedances. In order to expedite the description only, the operation of a single device 62 and its resistors 86 and 88 will be specifically set forth since it is apparent that the others operate similarly. FIG. 2B illustrates the conducting paths during the interval $t_2$–$t_6$ and may be referred to for a better understanding of the following description. Initially, the device 62 will offer little, if any, impedance to reverse current and the reverse voltage across the device 18 will be only the low forward drop of the diode 78. This low impedance of device 62 permits sufficient current to flow to reform the junctions $J_1$ and $J_3$ (FIG. 5). The diode 94 is optional but its presence permits a portion of the excess current required to reform the device 62 at a more rapid rate than if this current were required to flow through the resistors 86 and 88. In this regard it should be noted that the resistors 86 and 88 are shunt connected with the low impedance source 16 and series connected with the diode 94. As the device 62 reforms, its impedance increases and it supports more and more of the voltage which appears between the input terminal and the bus 66. Since the forward drop of the diode 78 is only a small fraction of the voltage between buses 60 and 66, the network 62–86–88 is in effect connected between the buses 60 and 66. Therefore, the forward voltage which appears across the device 18 is substantially the voltage across the device 62. This voltage starts at an amount which is the sum of the value of the forward voltage of the diode 78 and the initial value of the drop across the device 62 which is small. As the device 62 reforms, this voltage increases until when it is fully reformed the voltage drop thereacross is substantially that which exists between the buses 60 and 62.

Although the invention has been described with reference to a certain specific embodiment thereof, numerous modifications falling within the spirit and scope of the invention are possible and it is desired to cover all modifications within the spirit and scope of the invention.

What is claimed and is desired to be secured by United States Letters Patent is as follows:

1. In an inverter, a pair of semiconductor electric valves, each said valve having a power circuit and a control circuit, each said control circuit operable to control at least the initiation of current flow through its associated said power circuit, a pair of output terminals, first and second asymmetric current devices, a first current conducting path connected to said terminals for flow of current therebetween in a first direction and including said power circuit of a first of said valves and said first asymmetric device, said first asymmetric device being intermediate said first valve and one of said terminals, a second current conducting path connected to said terminals for flow of current therebetween in a second direction and including said power circuit of a second of said valves and said second asymmetric device, said second asymmetric device being intermediate said second valve and the other of said terminals, means connected to said control circuits for sequentially rendering said current conducting circuits conducting, first and second impedance devices, and means connecting said first impedance device in series circuit with said first asymmetric device and between said output terminals and said second impedance device in series circuit with said second asymmetric device and between said output terminals.

2. In an inverter, a pair of semiconductor electric valves, each said valve having a power circuit and a control circuit, each said control circuit operable to control at least the initiation of current flow through its associated said power circuit, a pair of output terminals, a pair of input terminals, first and second asymmetric current devices, a first power path connecting said pair of input terminals to said pair of output terminals and including said power circuit of a first of said valves and said first asymmetric device, said first valve being positioned intermediate a first of said input terminals and a first of said output terminals, said first asymmetric device being intermediate said first valve and said first output terminal, a second power path connecting said pair of input terminals to said pair of output terminals and including said power circuit of a second of said valves and said second asymmetric device, said second valve being positioned intermediate the other of said input terminals and the other of said output terminals, said second asymmetric device being intermediate said second valve and said other output terminal, means connected to said control circuit for sequentially rendering said power circuits conducting, first and second impedance devices, and means connecting said first impedance device in series circuit with said first asymmetric device and between said output terminals and said second impedance device in series circuit with said second asymmetric device and between said output terminals.

3. In an inverter, a pair of semiconductor electric valves, each said valve having a power circuit and a control circuit, each said control circuit operable to control at least the initiation of current flow through its associated said power circuit, a pair of output terminals, a pair of input terminals, first and second rise time semiconductor diode devices, a first power path connecting said pair of input terminals to said pair of output terminals and including said power circuit of a first of said valves and said first rise time device, said first rise time device having a first terminal connected to said first valve and having a second terminal connected to one of said output terminals, a second power path connecting said pair of input terminals to said pair of output terminals and including said power circuit of a second of said valves and said second asymmetric rise time device, said second rise time device having a first terminal connected to said second valve and having a second terminal connected to a first of said output terminals, means connected to said control circuit for sequentially rendering said power circuits conducting, first and second impedance devices, means connecting said first impedance device between said first terminal of said first rise time device and one of said input terminals in shunting relationship with said first rise time device and said output terminals and said second impedance device between said first terminal of said second rise time device and a first of said input terminals in shunting relationship with said second rise time device and said output terminals, first and second unidirectional current conducting devices, means connecting said first unidirectional current device in series circuit with said first impedance device between said input terminals with said first unidirectional device in anti-parallel with said power circuit of said first valve, and means connecting said second unidirectional current device in series circuit with said second impedance device between said input terminals with said second unidirectional device in anti-parallel with said power circuit of said second valve.

4. An apparatus of the character described comprising, a first and a second and a third and a fourth terminal, first and second semiconductor valves, each said valve having a main power circuit and a control path, each said control circuit being operable to control at least the initiation of current through the said power circuit with which it is associated, initiating means connected to said control circuits for actuation thereof to initiate current flow through one of said power circuits, first and second rise time unidirectional current flow devices, each said rise time device having a low impedance to current flow in a forward direction and a higher impedance to current flow in a backward direction, first and second diode devices having a low impedance to current flow in a forward direction and a higher impedance to current flow in a backward direction, first and second impedance devices, first circuit means connecting said first terminal to said third terminal for flow of current in a first direction between said first and third terminals, said first circuit means including said power circuit of said first valve connected in series with said first rise time device and with said first rise time device arranged such that its said forward direction is the same as said first direction, second circuit means connecting said second terminal to said third terminal for flow of current in one direction between said second and third terminals, said second circuit means including said power circuit of said second valve connected in series with said second rise time device and with said second rise time device arranged such that its said forward direction is the same as said one direction, third circuit means connecting said first and third terminals for flow of current therebetween in a second direction opposite to said first direction, said third circuit means including said first diode device arranged such that its said forward direction is the same as said second direction, fourth circuit means connecting said second and third terminals for flow of current therebetween in a direction opposite to said one direction, said fourth circuit means including said second diode device arranged such that its said forward direction is the same as said opposite direction, fifth circuit means connecting the common connection between said first valve and said first rise time device to said second terminal and including said first impedance device, and sixth circuit means connecting the common connection between said second valve and said second rise time device to said first terminal and including said second impedance device.

5. An apparatus of the character described comprising, a first and a second and a third and a fourth terminal, first and second semiconductor valves, each said valve having a main power circuit and a control path, each said control circuit being operable to control at least the initiation of current through the said power circuit with which it is associated, initiating means connected to said control circuits for actuation thereof to initiate current flow through one of said power circuits, first and second rise time unidirectional current flow devices, each said rise time device having a low impedance to current flow in a forward direction and a higher impedance to current flow in a backward direction, first and second diode devices having a low impedance to current flow in a forward direction and a higher impedance to current flow in a backward direction, first and second impedance devices, first circuit means connecting said first terminal to said third terminal for flow of current in a first direction between said first and third terminals, said first circuit means including said power circuit of said first valve connected in series with said first rise time device and with said first rise time device arranged such that its said forward direction is the same as said first direction, second circuit means connecting said second terminal to said third terminal for flow of current in one direction between said second and third terminals, said second circuit means including said power circuit of said second valve connected in series with said second rise time device and with said second rise time device arranged such that its said forward direction is the same as said one direction, third circuit means connecting said first and third terminals for flow of current therebetween in a second direction opposite to said first direction, said third circuit means including said first diode device arranged such that its said forward direction is the same as said second direction, fourth circuit means connecting said second and third terminals for flow of current therebetween in a direction opposite to said one direction, said fourth circuit means including said second diode device arranged such that its said forward direction is the same as said opposite direction, fifth circircuit means connecting the common connection between said first valve and said first rise time device to said second terminal and including said first impedance device, sixth circuit means connecting the common connection between said second valve and said second rise time device to said first terminal and including said second impedance device, means responsive to the existence of a predetermined potential drop across said first impedance device for rendering said initiating means ineffective to actuate said control circuit of said second valve, and means responsive to the existence of a predetermined potential drop across said second impedance device for rendering said initiating means ineffective to actuate said control circuit of said first valve.

6. An apparatus of the character described comprising, first and second and third terminals, a semiconductor valve having a power circuit for conducting current in a first direction, an impedance having first and second connections, means connecting said power circuit between said first terminal and said first connection of said impedance, means connecting said second connection of said impedance to said second terminal, first and second asymmetric current conducting devices, each said device having a lesser impedance to current in a forward direction and a greater impedance to current in a rearward direction, a circuit connected between said first terminal and said first connection and including said asymmetric devices connected in series with their forward directions opposite to said first direction, and means connecting the common connection between said asymmetric devices to said third terminal.

7. An apparatus of the character described comprising, first and second and third terminals, a semiconductor valve having a power circuit and a control circuit operable to control at least the initiation of current through said power circuit in a first direction, an impedance having first and second connections, means connecting said power circuit between said first terminal and said first connection of said impedance, means connecting said second terminal of said impedance to said second terminal, first and second asymmetric current conducting devices, each said device having a lesser impedance to current in a forward direction and a greater impedance to current in a rearward direction, a circuit connected between said first terminal and said first connection and including said asymmetric devices connected in series with their forward directions opposite to said first direction, means connecting the common connection between said asymmetric devices to said third terminal, switch means, circuit means connecting said second and third terminals and including said switch means, and sequencing means connected to said circuit means and to said control circuit and operable to render said power circuit conducting and to close said switch means.

8. An apparatus of the character described comprising, first and second and third terminals, a semiconductor valve having a power circuit and a control circuit operable to control at least the initiation of current through said power circuit in a first direction, an impedance, means connecting said power circuit between said first terminal and said impedance, means connecting said impedance between said second terminal and said power circuit, first and second asymmetric current conducting devices, each said device having a lesser impedance to current in a forward direction and a greater impedance to current in a rearward direction, a circuit connected in shunt with said power circuit including said asymmetric devices connected in series with their forward directions opposite to said first direction, means connecting the common connection between said asymmetric devices to said third terminal, switch means, circuit means connecting said second and third terminals and including said switch means, sequencing means connected to said circuit means and to said control circuit and operable to render said power circuit conducting and to close said switch means, and means responsive to an initial potential across said impedance for rendering said sequencing means ineffective to close said switch means.

9. In a network of the character described, a pair of input terminals, a pair of output terminals, a pair of switching devices, each said device having a power circuit and a control circuit actuable to initiate flow of current in said power circuit, a first current path interconnecting said pairs of terminals and including said power circuit of a first of said devices, a second current path interconnecting said pairs of terminals and including said power circuit of a second of said devices, first and second impedance apparatus, means connecting said first apparatus in series with said power circuit of said first device and in shunt with a portion of said first path, means connecting said second apparatus in series with said power circuit of said second device and in shunt with a portion of said second path and control means connected to said control circuits and effective to sequentially actuate said circuits whereby said power circuits are alternately rendered conductive, said control means including means connected to and actuated by said first and second impedance apparatus to modify the actuation of said second and first control circuits respectively as a function of the energized condition of said first and second impedance apparatus.

10. In a network of the character described, a pair of input terminals, a pair of output terminals, a pair of switching devices, each said device having a power circuit and a control circuit actuable to initiate flow of current in said power circuit, a first current path interconnecting said pairs of terminals and including said power circuit of a first of said devices, a second current path interconnecting said pairs of terminals and including said power circuit of a second of said devices, first and second impedance apparatus, means connecting said first apparatus in series with said power circuit of said first device and in shunt with a portion of said first path, means connecting said second apparatus in series with said power circuit of said second device and in shunt with a portion of said second path, an oscillator having a pair of output terminals supplied with alternating potential, a control network interconnecting said oscillator terminals and said control circuits in such polarity that at one polarity of said alternating potential one of said power circuits is rendered conducting and at the other polarity of said alternating potential the other of said power circuits is rendered conducting, and means interconnecting said impedance apparatuses and said control network and operable in response to a critical potential across one of said impedance apparatuses for rendering said control network ineffective to actuate at least one of said control circuits.

11. In a network of the character described, a first pair of input terminals, a pair of output terminals, a pair of switching devices, each said device having a power circuit and a control circuit actuable to initiate flow of current in said power circuit, a first current path interconnecting said pairs of terminals and including said power circuit of a first of said devices, a second current path interconnecting said pairs of terminals and including said power circuit of a second of said devices, a transformer having primary and secondary winding means and tertiary winding means and a core which is proportioned to saturate within the normal energization of said primary winding means, a second pair of input terminals, first and second valves, each said valve having a power circuit and a control circuit, a third current path connecting said second pair of input terminals to said primary winding means and including said power circuit of said first valve, a fourth current path connecting said second pair of input terminals to said primary winding means and including said power circuit of said second valve, said third and fourth paths being polarized relative to said primary winding means such that conduction of said third path causes flux to increase in a first direction and conduction of said fourth path causes flux to increase in a second direction, means connecting said tertiary winding means to said control circuits of said valves in such polarity that increase in flux in said first direction causes said power circuit of said first valve to be conductive and increase in flux in said second direction causes said power circuit of said second valve to be conductive, a pair of output terminals energized with pulsating potential, unidirectional current conducting means, circuit means connecting said last-named terminals to said tertiary winding means and including said unidirectional means, said unidirectional means being polarized to prevent direct energization of said control circuits of said valve by said oscillator and to permit direct energization of said tertiary winding means by said oscillator, and circuit means connecting said secondary winding means to said control circuits of said switching devices in such polarity that said power circuit of said first switching device is rendered conductive upon change in flux in said core in one direction and said power circuit of said second switching device is rendered conductive upon change in flux in said core in an opposite direction.

12. In a network of the character described, a first pair of input terminals, a pair of output terminals, a pair of switching devices, each said device having a power circuit and a control circuit actuable to initiate flow of current in said power circuit, a first current path interconnecting said pairs of terminals and including said power circuit of a first of said devices, a second current path interconnecting said pairs of terminals and including said power circuit of a second of said devices, a transformer having primary and secondary winding means and first and second tertiary windings and a core which is proportioned to saturate within the normal energization of said primary winding means, a second pair of input terminals, first and second valves, each said valve having a power circuit and a control circuit, a third current path connecting said second pair of input terminals to said primary winding means and including said power circuit of said first valve, a fourth current path connecting said second pair of input terminals to said primary winding means and including said power circuit of said second valve, said third and fourth paths being polarized relative to said primary winding means such that conduction of said third path causes flux to increase in a first direction and conduction of said fourth path causes flux to increase in a second direction, fifth circuit means connecting said first tertiary winding to said control circuit of said first valve and polarized such that an increase in said flux in said first direction causes said power circuit of said first valve to be conductive, sixth circuit means connecting said second tertiary winding to said control circuit of said second valve and polarized such that an increase in said flux in said second direction causes said power circuit of said second valve to be conductive, a second transformer having a primary winding and a secondary winding, said secondary winding having end terminals and an intermediate terminal, first and second asymmetric current conducting devices having a lower impedance to current flow in a forward direction and a higher impedance to current flow in a rearward direction, circuit means connecting said first tertiary winding between one of said end terminals and said intermediate terminal and including said first asymmetric device, said first asymmetric device being arranged such that its said forward current flows through said first tertiary winding in a direction to induce said flux in said core in said second direction, and circuit means connecting said second tertiary winding between the other of said end terminals and said intermediate terminal and including said second asymmetric device, said second asymmetric device being arranged such that its said forward current flows through said second tertiary winding in a direction to induce flux in said core in said first direction, and a source of pulsating potential connection to said primary winding.

13. In a network of the character described, a first pair of input terminals, a pair of output terminals, a pair of switching devices, each said device having a power circuit and a control circuit actuable to initiate flow of current in said power circuit, a first current path interconnecting said pairs of terminals and including said power circuit of a first of said devices, a second current path interconnecting said pairs of terminals and including said power circuit of a second of said devices, first and second impedance apparatus, means connecting said first apparatus in series with said power circuit of said first device and in shunt with a portion of said first path, means connecting said second apparatus in series with said power circuit of said second device and in shunt with a portion of said second path, a transformer having primary and secondary winding means and first and second tertiary windings and a core which is proportioned to saturate within the normal energization of said primary winding means, a second pair of input terminals, first and second valves, each said valve having a power circuit and a control circuit, a third current path connecting said second pair of input terminals to said primary winding means and including said power circuit of said first valve, a fourth current path connecting said second pair of input terminals to said primary winding means and including said power circuit of said second valve, said third and fourth paths being polarized relative to said primary winding means such that conduction of said third path causes flux to increase in a first direction and conduction of said fourth path causes flux to increase in a second direction, fifth circuit means connecting said first tertiary winding to said control circuit of said first valve and polarized such that an increase in said flux in said direction causes said power circuit of said first valve to be conductive, sixth circuit means connecting said second tertiary winding to said control circuit of said second valve and polarized such that an increase in said flux in said second direction causes said power circuit of said second valve to be conductive, a second transformer having a primary winding and a secondary winding, said secondary winding having end terminals and an intermediate terminal, first and second asymmetric current conducting devices having a lower impedance to current flow in a forward direction and a higher impedance to current flow in a rearward direction, circuit means connecting said first tertiary winding between one of said end terminals and said intermediate terminal and including said first asymmetric device, said first asymmetric device being arranged such that its said forward current flows through said first tertiary winding in a direction to induce said flux in said core in said second directon, circuit means connecting said second tertiary winding between the other of said end terminals and said intermediate terminal and including said second asymmetric device, said second asymmetric device being arranged such that its said forward current flows through said second tertiary winding in a direction to induce flux in said core in said first direction, and a source of pulsating potential connected to said primary winding, circuit controlling switching apparatus having a control element controlling the flow of current therethrough, means connecting said switching apparatus intermediate said source of pulsating potential and said tertiary windings to control the energization of said tertiary windings from said source of pulsating potential, and circuit means interconnecting said impedance apparatuses and said control element of said switching apparatus and effective as a consequence of a predetermined minimum energization of one of said impedance apparatuses to saturate said switching apparatus to interrupt the energization of said tertiary windings by said source of pulsating potential.

14. An apparatus of the character described comprising, first and second and third terminals, a semiconductor valve having a power circuit for conducting current in a first direction, an impedance having first and second connections, means connecting said power circuit between said first terminal and said first connection of said impedance, means connecting said second connection of said impedance to said second terminal, first and second and third asymmetric current conducting devices, each said device having a lesser impedance to current in a forward direction and a greater impedance to current in a rearward direction, a circuit connected between said first terminal and said first connection and including said first and second asymmetric devices connected in series with their forward directions opposite to said first direction, means connecting said first connection to said first terminal and including said third asymmetric device, said third device having its forward direction opposite to said first direction, and means connecting the common connection between said asymmetric devices to said third terminal.

References Cited by the Examiner

UNITED STATES PATENTS

| | | | |
|---|---|---|---|
| 2,888,622 | 5/1959 | Mooers | 321—47 |
| 3,059,191 | 10/1962 | Hierholzer. | |
| 3,120,634 | 2/1964 | Genuit | 321—45 |
| 3,213,349 | 10/1965 | Gutzwiller. | |
| 3,246,226 | 4/1966 | Geisler et al. | 321—45 X |

JOHN. F. COUCH, *Primary Examiner.*

W. M. SHOOP, *Assistant Examiner.*